(12) United States Patent
Frodsham et al.

(10) Patent No.: US 10,009,111 B2
(45) Date of Patent: Jun. 26, 2018

(54) LIGHTING FIXTURE AND SYSTEM USING FREE SPACE OPTICAL COMMUNICATION PROCESS

(71) Applicant: LSI Industries Inc., Cincinnati, OH (US)

(72) Inventors: Robin Tim Frodsham, Portland, OR (US); Mark Van Wagoner, Cincinnati, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days. days.

(21) Appl. No.: 15/357,454

(22) Filed: Nov. 21, 2016

(65) Prior Publication Data

US 2017/0149499 A1 May 25, 2017

Related U.S. Application Data

(60) Provisional application No. 62/257,475, filed on Nov. 19, 2015.

(51) Int. Cl.
*H04B 10/50* (2013.01)
*H04B 10/116* (2013.01)
*H05B 33/08* (2006.01)

(52) U.S. Cl.
CPC ......... *H04B 10/502* (2013.01); *H04B 10/116* (2013.01); *H05B 33/0827* (2013.01)

(58) Field of Classification Search
CPC ..... H04B 10/502; H04B 10/11–10/116; H05B 33/0827
See application file for complete search history.

(56) References Cited

U.S. PATENT DOCUMENTS

| | | | | |
|---|---|---|---|---|
| 2010/0247106 A1* | 9/2010 | DiPoala | ............. | H04B 10/1127 398/129 |
| 2011/0133546 A1* | 6/2011 | Jang | .................. | H02M 7/53871 307/9.1 |
| 2014/0270793 A1* | 9/2014 | Bradford | ............. | H04B 10/116 398/118 |

* cited by examiner

*Primary Examiner* — David Payne
*Assistant Examiner* — Casey Kretzer
(74) *Attorney, Agent, or Firm* — Wood Herron & Evans LLP

(57) ABSTRACT

A light fixture includes an array of light-emitting elements for generating light from the light fixture, and the array of light-emitting elements includes a defined sub-array of light-emitting elements. An alternate array of light-emitting elements is coupled in parallel with the defined sub-array of alternate light-emitting elements of the light emitter. Each of the sub-array and the alternate array are coupled with a respective switch element. A control circuit is coupled with the switch elements and configured for selectively switching power between the sub-array and the alternate array for modulating the operation of the sub-array and alternate array of light-emitting elements to generate modulated communication signals.

14 Claims, 4 Drawing Sheets

LIGHTING FIXTURE AND SYSTEM USING FREE SPACE OPTICAL COMMUNICATION PROCESS

CROSS-REFERENCE TO RELATED CASES

This application claims the benefit of U.S. Provisional Patent Application Ser. No. 62/257,475 filed on Nov. 19, 2015, the disclosure of which is expressly incorporated by reference herein in its entirety.

FIELD OF THE INVENTION

This invention related generally to free-space optical communication, and particularly to visible light communication and other similar communications.

BACKGROUND OF THE INVENTION

Lighting fixtures may be used to communicate between each other, or with other elements in a system. One way of communicating with such fixtures involves the use of Visible Light Communication (VLC) or other free space optical communications, such as infra-red and/or ultra-violet communications. Light bulbs utilizing LED elements and the increasing use of such LED light fixtures have provided additional opportunities for the use of VLC for the purposes of programming and control and communication.

For example, VLC and similar techniques might be used for commissioning or programming various fixtures in a system. In the lighting industry, it is desirable to ensure that all installed lighting fixtures or elements, such as within a building, are controlled as desired. When a lighting system is activated, it is tested and the control circuitry for the system is programmed and calibrated to ensure proper operation. The term "commissioning" is often used to describe such system activation, programming, calibration, and testing. For the purposes of commissioning, it is desirable to communicate with the various light fixtures and the control circuitry for the fixtures for the purposes of programming and controlling those fixtures to operate according to system parameters and control programs.

Existing VLC systems use fixtures wherein the entire fixture is implemented or affected for providing VLC. For example, some VLC systems have fixtures that will switch an entire LED diode string or array, i.e., every element in the array, in order to provide the modulation light output necessary for VLC. As such, existing VLC system designs and fixtures also must modify the entire power system and driver for a fixture to modulate the entire diode chain in the light fixture. Such control introduces complexity into a fixture, as well as increased expense. Additionally, separate power supplies or power transistors may be necessary for such VLC operation, involving expensive and independent power supplies and control circuits. Such complicated systems may also detrimentally introduce more heat into the fixture, that then has to be addressed.

The present invention is directed to providing VLC and free space optical communications in a low complexity and low cost embodiment. It is further desirable to introduce VLC capabilities into fixtures within a pricing range that was not possible in the past. Furthermore, it is desirable to enable such VLC without detrimentally affecting the overall illumination process of the fixture.

SUMMARY OF THE INVENTION

A light fixture includes an array of light-emitting elements for generating light from the light fixture. The array of light-emitting elements includes a defined sub-array of light-emitting elements and an alternate array of light-emitting elements coupled electrically in parallel with the defined sub-array of light-emitting elements. Each of the sub-array and the alternate array are coupled with a respective switch element to switch between arrays. A control circuit is coupled with the switch elements and is configured for selectively switching power between the sub-array and the alternate array for modulating the operation of the sub-array and alternate array of light-emitting elements to generate modulated communication signals for VLC.

In embodiments of the invention, the light-emitting elements in the sub-array may vary in light intensity, in light temperature, in frequency and between visible and invisible radiation with respect to the light-emitting elements in the alternate array, such that the fixture is modulated for providing the modulated VLC communication signals. For example, the alternate array might include elements to generate at least one of infrared (IR) radiation and ultraviolet (UV) radiation.

The accompanying drawings, which are incorporated in and constitute a part of this specification, illustrate embodiments of the invention and, together with a general description of the invention given below, serve to explain the principles of the invention. It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Light fixtures or luminaires for use in accordance with the invention utilize a light emitter or light source having a plurality of individual light-emitting elements that operate cooperatively to provide the desired light or illumination. For example, LED light fixtures may typically be composed of a string/strings or array(s) of a plurality of individual LED devices.

Figure 1:
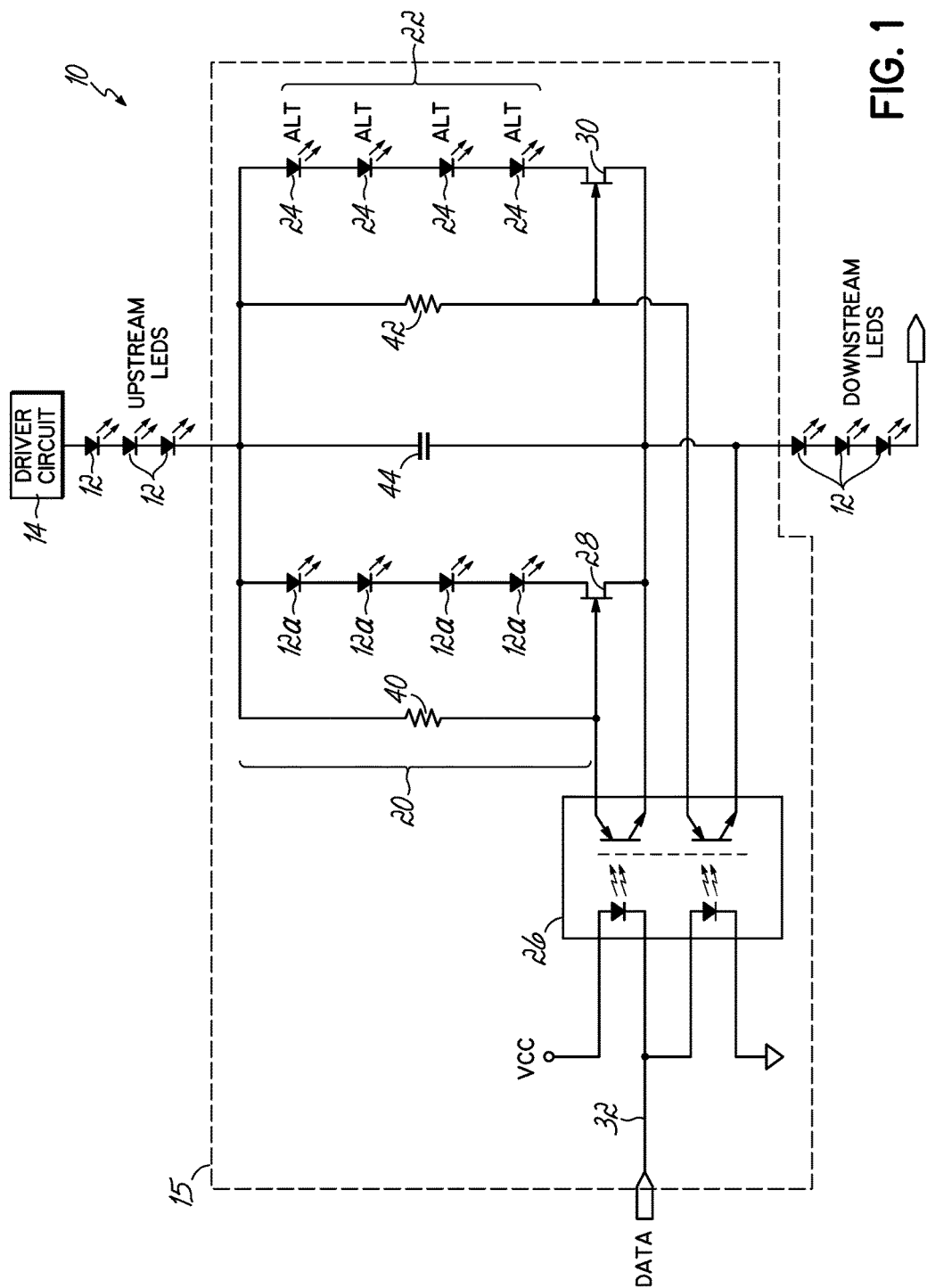
FIG. 1 is a schematic view of one embodiment of the invention.

FIG. 1 illustrates one exemplary embodiment of the invention incorporating such a string or array of LEDs that form the light emitter or emitting element for a fixture, and incorporating features of the invention. Specifically, light fixture or system 10 includes a plurality or array of LED elements 12 shown, for illustrative purposes only, arranged in a string array that forms the emitter element for the fixture. Fixture 10 may incorporate any number of LED elements 12 to form the array, including a greater number of upstream and downstream LED elements from those shown in FIG. 1. As such, the invention is not limited to the number of LED elements 12 in an array of a fixture. Generally, in one embodiment of the invention, the elements 12 collectively generate visible light transmitted by the fixture, such as to illuminate a space.

In the embodiment illustrated in FIG. 1 and for the purposes of description, the light-emitting elements in the illustrated embodiments are shown as LED elements 12 and are shown arranged in one array string and are connected electrically in series. Other arrangements might be used as well in the invention. Herein, the light-emitting elements will also be referred to as "LED elements". However, the elements might be any suitable element for generating electromagnetic radiation, in accordance with the invention. The array is coupled with an appropriate power supply or driver circuit 14 for powering the elements. In normal usage, power is supplied to the LED elements 12 by driver circuit 14 to provide desired light from the fixture 10.

In accordance with one aspect of the invention, a sub-array or segment of the element array or string utilized in fixture 10 is isolated for separate control for the purposes of VLC or some other communication protocol. As illustrated in FIG. 1, a sub-array 20 of the element array includes one or more light-emitting elements 12a that are isolated and separately controlled for the purposes of providing the desired communication modulation as well as illumination. The sub-array has elements connected electrically in series if FIG. 1 similar to the larger fixture array of FIG. 1.

An alternate array 22 of alternate light-emitting elements is coupled in line with the overall fixture array and with the sub-array 20 for the purposes of communication. In the illustrated embodiment, the alternate array 22 of elements is shown in FIG. 1 electrically coupled in parallel with the defined sub-array 20. FIG. 1 also illustrates the elements of the alternate array arranged in a series electrical connection with respect to each other. The alternate elements 24 of array 22 may be different elements, such as non-visible radiation elements (infra-red LEDs, ultraviolet LEDs or any other electro-magnetic radiation source) or elements of a different color temperature, or different intensity. For the purpose of discussion herein, the elements 24 may also be referred to herein as alternate LED elements 24, but the invention is not limited and such alternate light-emitting elements 24 may also be any suitable electro-magnetic radiation source.

Modulating between the two arrays or sections (sub-array 20 and alternate array 22) allows communication at any desired frequency without burdening the electronic ballast with high frequency switching requirements in accordance with one aspect of the invention. This reduces the cost and complexity of the fixture, but still provides a VLC functionality.

More specifically, as illustrated in FIG. 1, the light elements 12a of sub-array 20 are coupled electrically in parallel with the alternate elements 24 of alternate array 22. Each of those arrays/sub-arrays 20, 22 is appropriately coupled with respective switch elements 28, 30, and appropriate control electronics, such as control circuit 26. Control circuit 26 is used to selectively drive switch elements 28, 30, for selectively powering the arrays 20, 22 respectively. In one embodiment of the invention, the switch elements may be appropriate transistors.

The entire array of elements 12, 12a is driven by the driver circuit 14, such as a current source power supply. In normal operations, the array of elements 12, 12a are powered together so that fixture 10 provides illumination. The control circuit 26 operates switch elements 28, 30 so that the array of upstream light elements 12, the sub array 20 of elements 12a, and the downstream elements 12 are powered appropriately, such as for illumination from the fixture. Then, for the purposes of communication, the alternate array 22 may be selectively powered and modulated.

Through the operation of control circuit 26, the sub-array 20 is isolated, such as through operation of switch 28. When communication is desired, the current from the driver circuit 14 is directed to the alternate array 22 of alternate elements 24 through the selective operation of switch 30. Through the control of circuit 26 and the switch elements (e.g., transistors) 28, 30, the elements 24 in the alternate array 22 may be modulated appropriately. Such modulation would be under the control of a modulation signal that might be provided to the control circuit 26 by one or more data lines 32 coupled appropriately with control circuit 26. For example, suitable modulation might be provided for the transmission of data according to IEEE 802.15.7 protocol for visible light communication (VLC). Other communication protocols might also be utilized in accordance with the invention for providing communication in accordance with the invention.

Control circuit 26 may be a suitable control circuit for providing proper utilization of the data on data line 32 for modulating the operation of arrays 20 and 22 and the respective light-emitting elements in order to achieve VLC communication. In the illustrated embodiments of the invention, the control circuit 26 includes an opto-isolator circuit that is utilized for driving or enabling transistors 28 and 30. However, other suitable control circuits, such as a processor circuit, might be implemented in accordance with the invention for modulating the arrays 20, 22.

In accordance with one aspect, the alternate array 22 and the alternate elements 24 therein might have a different intensity from the elements 12, 12a. Therefore, when the alternate array and sub-array are modulated, the fixture would be modulated in intensity under the control of circuit 26 to provide the desired VLC communications.

Alternatively, in another embodiment, the alternate array 22 might include alternate elements 24 having a different color temperature from the other elements 12, 12a. Therefore, when the alternate array and sub-array are modulated, the fixture would be modulated in color temperature under the control of circuit 26 to provide the desired VLC communications.

In still another embodiment of the invention, the alternate elements 24 of array 22 might be radiating elements that output radiation at a different frequency range from the elements 12, 12a. For example, the frequency of the radiation from the elements 24 might be in the non-visible range. For example, the elements 24 might include one or more infra-red (IR) or ultraviolet (UV) emitters for providing non-visible radiation modulation Therefore, when the alternate array and sub-array are modulated, the fixture would be modulated with non-visible radiation under the control of circuit 26 to provide the desired VLC communications.

Therefore, in accordance with the invention, modulating between the two stacks or arrays 20, 22 of light-emitting elements provides communication from fixture 10 at any desired frequency. One advantage provided by the invention is that the electronic ballast for the fixture 10 would not have to be burdened with high frequency switching requirements. The modulation in intensity, color temperature, or frequency profile that is provided by the invention can then be detected by other fixtures or devices in an area utilizing appropriate light reception and data demodulation circuitry. In that way, communication may be provided through a VLC protocol without an expensive and complicated design for the fixture.

As shown in FIG. 1, the communication section 15 of the fixture 10 may implement appropriate other elements, such as resistor elements 40, 42, as necessary for the sections 20, 22 of LED elements. An optional capacitor 44 might be implemented to minimize switching transience.

The present invention provides several advantages, and provides VLC or other communications without requiring an extra power supply for each light fixture. Furthermore, no additional heat is added in each fixture, which is an important consideration, particularly with LED light fixtures. Simple logic is utilized to provide the modulation and communication control.

In accordance with another aspect of the invention, the present invention does not disturb significantly the current power supply or driver circuit 14 for each of the light fixtures. That is, the driver circuit 14 would generally not know that VLC or some other communication is proceeding, as the voltage and current conditions are not drastically changed between the conditions of VLC modulation and communication and simple illumination from the fixture. Essentially, the same or a similar voltage and current profile is seen by the driver circuit 14 with or without communication or during communication. To that end, the various implementations or embodiments of the invention provide a desirable flexibility in the design. Any particular number of light-emitting elements, such as LEDs, may be selected from the original array to form a functional sub-array 20. The sub-array, for example, might include one or more elements 12a. Any number of elements or LEDs or other electromagnetic elements 24 can also be utilized in the alternate array 22 in order to achieve the desired minimization of changes in the voltage and current profiles when modulation between the arrays is used for VLC or other.

Figure 2:
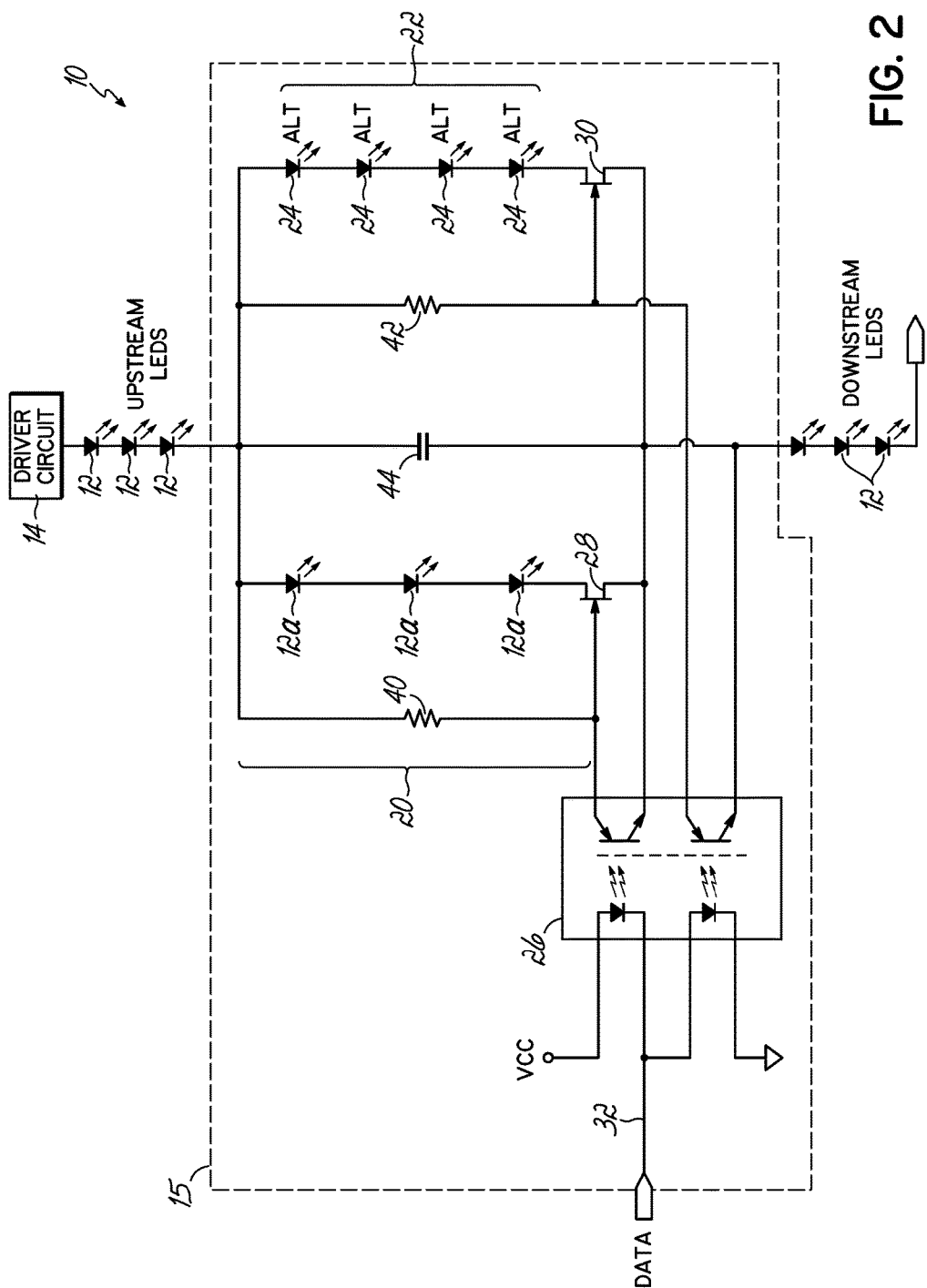
FIG. 2 is a schematic view of another embodiment of the invention.

FIG. 1 illustrates sub-array 20 and alternate array 22 with an equal number of elements 12a and 24 each. However, those numbers may vary. In accordance with one embodiment of the invention, the number of elements 12a used in the sub-array 20 may be different, that is greater or lesser, than the number of elements 24 used in the alternate array. FIG. 2 illustrates another embodiment of the invention, wherein the number of LED elements 12a or other light-emitting elements that are isolated as part of sub-array 20, are less than the number of alternate LED elements 24 that form part of alternate array 22. Specifically, three elements 12a are isolated in sub-array 20, wherein the section of alternate elements in alternate array 22 includes four LED elements 24. The opposite could be true as well with a greater number of elements 12a in the sub-array 20 than the number of elements 24 in the alternate array. In the embodiment of FIG. 2, both the elements 12a and 24 are connected electrically in series with each other in the respective array, even the though the arrays 20 and 22 are connected electrically in parallel.

Figure 3:
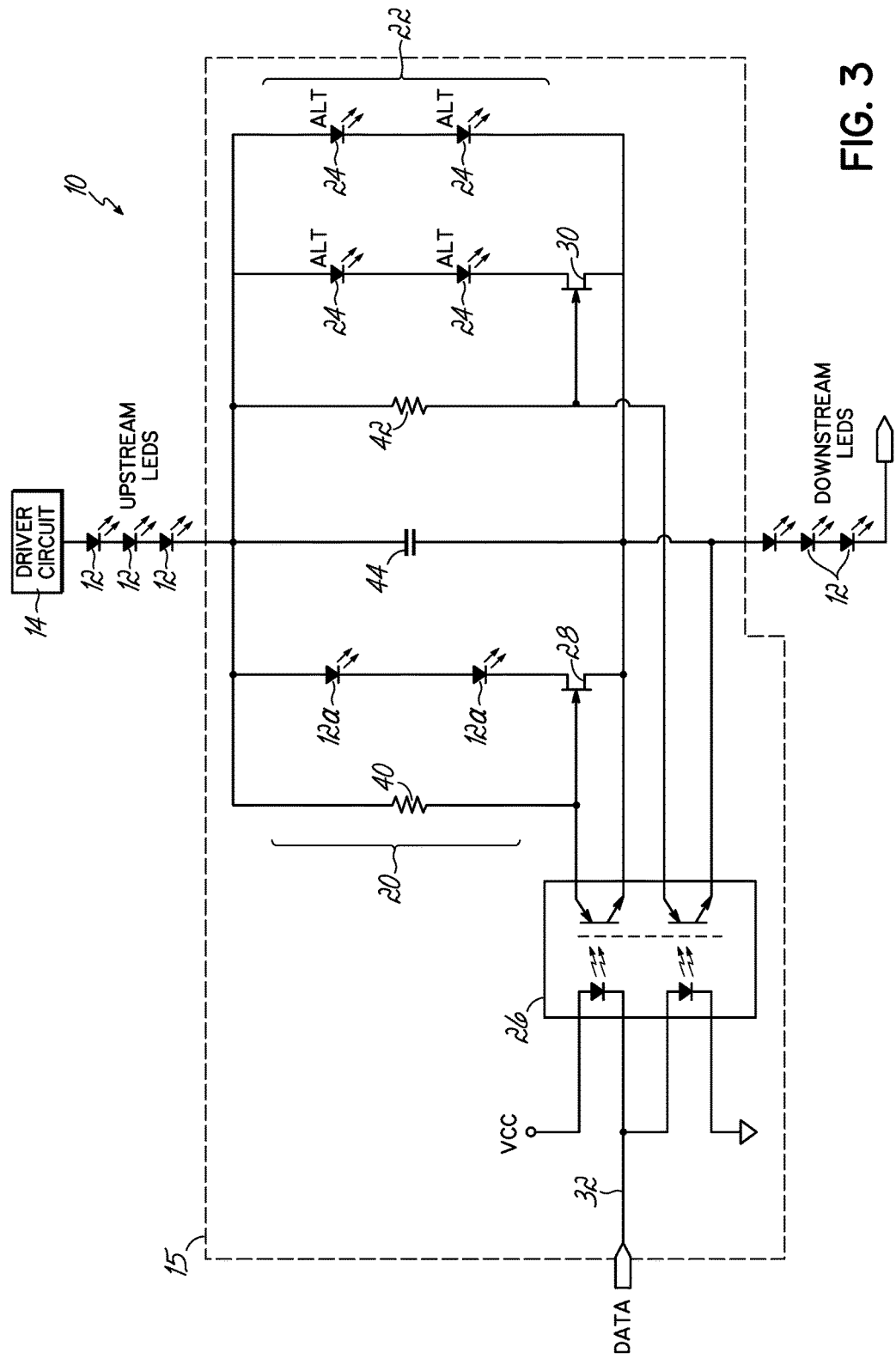
FIG. 3 is a schematic view of another embodiment of the invention.

FIG. 3 illustrates another embodiment of the invention, wherein the arrangement of alternate elements 24 in the alternate array 22 may incorporate a plurality of parallel legs or a different arrangement of elements for the purposes of minimizing voltage and current differences when switching from sub-array 20 to an alternate array 22. Referring to FIG. 3, section 20 isolates two elements 12a in sub-array 20, while the alternate array 22 utilizes four alternate elements 24. The elements 24 that are arranged in two electrically parallel sections or legs with 2 elements in each parallel leg of the array 22. Therefore, in accordance with aspects of the invention, the isolated sub-array of the string of light-emitting elements of the emitter structures of a light fixture may have a different number of elements from the alternate array, and there may be a different electrical arrangement between the two arrays 22, 24. Depending upon the elements 12a, 24 selected both for the sub-array 20 and also for the alternate array 22, the different circuit arrangements might vary in order to minimize differences in the voltage and current profiles seen between the arrays 20, 22, when the arrays are modulated as disclosed for the purposes of VLC communications.

Figure 4:
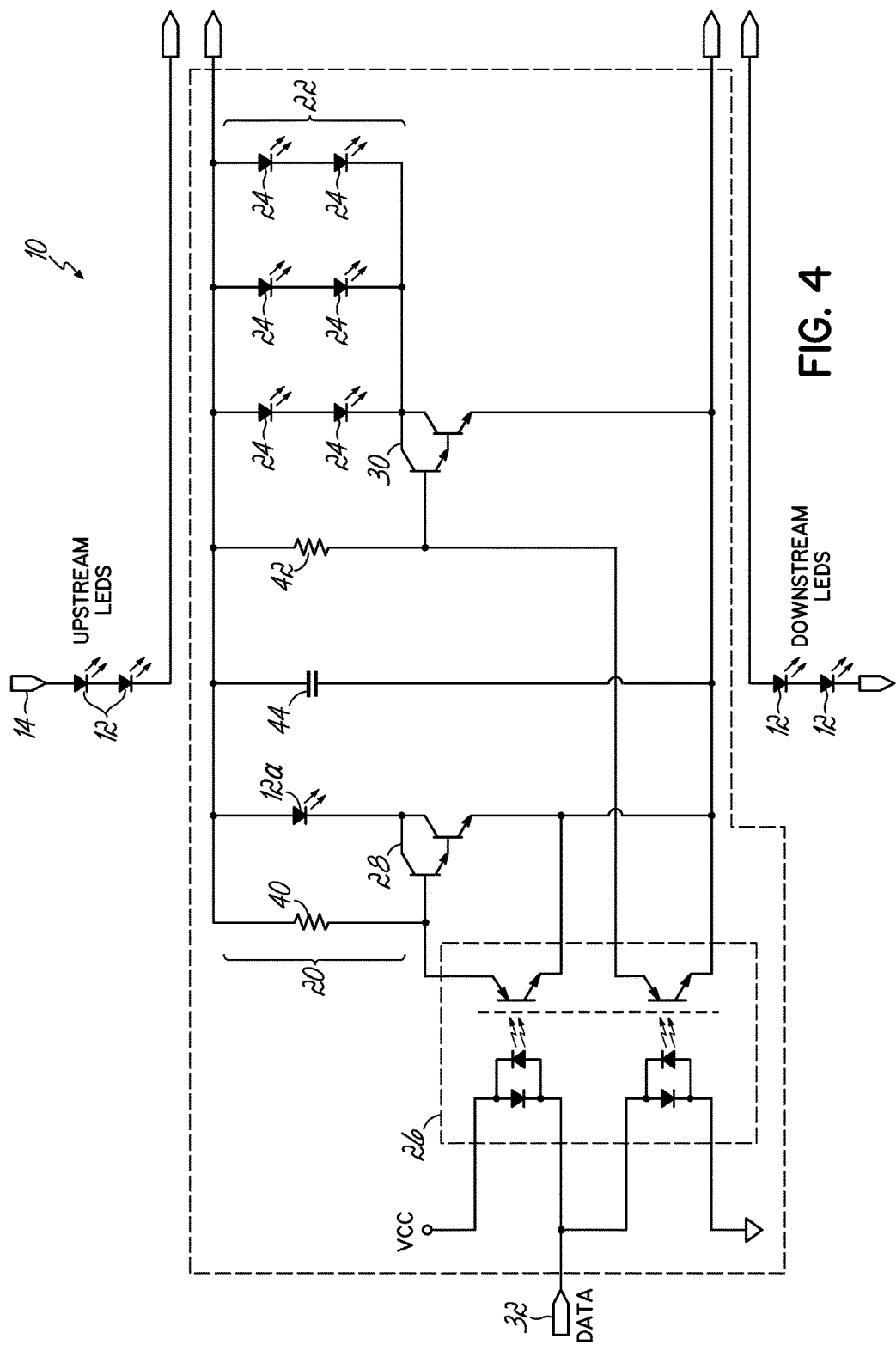
FIG. 4 is a schematic view of another embodiment of the invention.

FIG. 4 illustrates another alternative embodiment of the invention, which incorporates a single element 12a in sub-array 20, in conjunction with six infra-red (IR) light-emitting elements in an alternate array. The alternate array 22 has elements that are arranged in three parallel legs, with two elements in each leg. In a specific embodiment, the IR elements might be TSAL 6400 elements, available from Vishay Intertechnology, Inc., Malvern, Pa., USA. The specific switching transistors 28, 30 might be MPSA29 NMOS Darlington Elements, available from Fairchild SemiConductor Corp. of San Jose, Calif., USA. The control circuit 26 also uses opto-isolators for the modulation purposes of controlling the switch elements 28, 30.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A light fixture comprising:
    an array of light-emitting elements for generating light from the light fixture, the array of light-emitting elements including a defined sub-array of a number of light-emitting elements smaller than the number of elements in the array, the light-emitting elements of the array operable for generating visible light radiation;
    an alternate array of light-emitting elements coupled electrically in parallel with the defined sub-array of light-emitting elements, the light-emitting elements of the alternate array being operable for generating non-visible radiation;
    each of the sub-array and the alternate array electrically coupled with a respective switch element to individually control the sub-array and alternate array independently of the remaining elements of the array;
    a control circuit coupled with the switch elements and configured for selectively switching power between the sub-array and the alternate array for modulating the operation of the sub-array and the non-visible radiation elements of the alternate array of light-emitting elements to generate modulated communication signals with the alternate array of light-emitting elements while the remaining elements of the array continue to operate.

2. The light fixture of claim 1 wherein the non-visible radiation includes at least one of infrared (IR) radiation and ultraviolet (UV) radiation.

3. The light fixture of claim 1 wherein the array of light-emitting elements includes at least one LED element.

4. The light fixture of claim 1 wherein the sub-array of light-emitting elements includes at least one LED element.

5. The light fixture of claim 1 wherein the alternate array of light-emitting elements includes at least one LED element.

6. The light fixture of claim 1 wherein elements in the sub-array and alternate array are electrically connected in series in the respective arrays.

7. The light fixture of claim 1 wherein elements in the sub-array are electrically connected in series in the sub-array and elements in the alternate array are electrically connected in parallel in the alternate array.

8. The light fixture of claim 1 wherein at least one of the switch elements includes a transistor.

9. The light fixture of claim 1 wherein the control circuit includes at least one data line for providing a modulation signal for the control circuit for control of the modulated communication signals.

10. The light fixture of claim 1 wherein the control circuit includes an opto-isolator circuit for control of the switch elements.

11. The light fixture of claim 1 wherein the number of light-emitting elements in the sub-array is different than the number of light-emitting elements in the alternate array.

12. The light fixture of claim 1 wherein the number of light-emitting elements in the sub-array is less than the number of light-emitting elements in the alternate array.

13. The light fixture of claim 1 wherein the number of light-emitting elements in the sub-array is greater than the number of light-emitting elements in the alternate array.

14. The light fixture of claim 1 wherein the number of light-emitting elements in the sub-array is equal to the number of light-emitting elements in the alternate array.

* * * * *